(12) United States Patent
Saruta

(10) Patent No.: US 7,667,382 B2
(45) Date of Patent: Feb. 23, 2010

(54) SUBSTRATE HAVING FLUORESCENT MEMBER, IMAGE DISPLAY APPARATUS AND IMAGE RECEIVING AND DISPLAYING APPARATUS

(75) Inventor: Shoshiro Saruta, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 335 days.

(21) Appl. No.: 11/765,728

(22) Filed: Jun. 20, 2007

(65) Prior Publication Data

US 2007/0296344 A1 Dec. 27, 2007

(30) Foreign Application Priority Data

Jun. 20, 2006 (JP) .............................. 2006-170080

(51) Int. Cl.
*H01J 1/62* (2006.01)
(52) U.S. Cl. ...................................... 313/496
(58) Field of Classification Search ................ 313/496, 313/498
See application file for complete search history.

(56) References Cited

U.S. PATENT DOCUMENTS

| 5,277,841 A | 1/1994 | Jeong et al. ............ 252/301.6 S |
| 5,559,397 A * | 9/1996 | Tsuruoka et al. ............ 313/496 |
| 2002/0008468 A1 | 1/2002 | Krishnan |
| 2007/0046176 A1* | 3/2007 | Bukesov et al. ............. 313/496 |
| 2007/0267600 A1 | 11/2007 | Saruta ................... 252/301.4 F |
| 2007/0290623 A1 | 12/2007 | Saruta ..................... 315/169.2 |

FOREIGN PATENT DOCUMENTS

| JP | 54-149570 | 11/1979 |
| JP | 63-39982 | 2/1988 |
| JP | 6-248262 | 9/1994 |
| JP | 2004-339293 | 12/2004 |

OTHER PUBLICATIONS

Chinese Notification of First Office Action dated May 8, 2009, regarding Application No. 200710111920.0.

* cited by examiner

*Primary Examiner*—Karabi Guharay
*Assistant Examiner*—Brenitra M Lee
(74) *Attorney, Agent, or Firm*—Fitzpatrick, Cella, Harper & Scinto

(57) ABSTRACT

A substrate having a fluorescent member arranged on a pixel area in a plane of a surface of the substrate, wherein the fluorescent member emits light by an irradiation with an electron and comprises a first fluorescent member having a larger gamma value and arranged in the pixel area, and a second fluorescent member having a smaller gamma value and arranged at a peripheral of the first fluorescent member within the pixel area.

10 Claims, 11 Drawing Sheets

SUBSTRATE HAVING FLUORESCENT MEMBER, IMAGE DISPLAY APPARATUS AND IMAGE RECEIVING AND DISPLAYING APPARATUS

BACKGROUND OF THE INVENTION

1. Field of the Invention

The present invention relates to a substrate having a fluorescent member used in an electronic display device which takes advantage of electron beam excitation. In addition, the present invention relates to an image display apparatus and image receiving and displaying apparatus using the substrate having a fluorescent member.

2. Description of the Related Art

In a conventionally known image display apparatus using an electron-emitting device which emits electrons by applying an electric field (hereinafter referred to as FED), a gap between a cathode substrate on an electron source side and a front substrate being an anode is limited generally to several mm for reasons of beam convergence and others. The small gap imposes considerable constraint on electric discharge resistance. Therefore, an accelerating voltage of as high as 25 kV used in a cathode ray tube (hereinafter referred to as CRT) can not be applied. Even an FED, generally referred to as being of high voltage type, typically uses an accelerating voltage of 15 kV or lower. For this reason, a diffusion length over which an electron enters a fluorescent-member layer is shorter compared with the case where a CRT is used, which requires drive by a high electric-charge density, for example, by a subsequent drive using high current electron beams to realize the luminance equivalent to that obtained by a CRT. This requires a fluorescent member to secure a luminance linearity when a high electric-charge density is applied.

A group of zinc sulfide fluorescent members which have long been used in a CRT and referred to as P22 is typically used as a present practically applicable fluorescent member excited by electron beams. The P22 fluorescent member which have long been used in a CRT is typically used even in the FED as described in Japanese Patent Publication No. S63-039982. The zinc sulfide fluorescent member, however, is as long as several tens of micro seconds in luminescent decay time because the member emits light by a donor-accepter recombination in a host material formed by exciting energy. Furthermore, the zinc sulfide fluorescent member is lower in an optimum luminescence center concentration in consideration of influence such as density quenching than inner transition phosphor doped with rare earth metal. This tends to comparatively easily cause the saturation of an excited luminescence center at a high electric-charge density area, leading to an insufficient luminance linearity not to provide a satisfactory luminance.

Various kinds of proposals have been put forth to solve these problems. Japanese Patent Application Laid-Open No. H06-248262 discloses a method of improving a blue luminance using a mixture of fluorescent members different in their characteristics. Specifically, a mixed blue light-emitting fluorescent member has been proposed which includes at least one fluorescent member selected from the group including terbium activated yttrium aluminum garnet fluorescent member $Y_3(Al,Ga)_5O_{12}$:Tb, terbium activated silicic acid yttrium fluorescent member $Y_2SiO_5$:Tb, terbium activated oxychloride lanthanum fluorescent member LaOCl:Tb, which are 20% or less by weight with respect to the total weight of the mixed fluorescent member, and silver-aluminum coactivated zinc sulfide fluorescent member ZnS:Ag,Al as a remaining portion of the total weight.

Japanese Patent Application Laid-Open No. 2004-339293 discloses a method of using a mixture of at least two kinds of fluorescent members selected from hexagonal crystal ZnS:Ag,Al, hexagonal crystal ZnS:Cu,Al and hexagonal crystal ZnS:Tm,Li.

SUMMARY OF THE INVENTION

The concentration of luminescence center of the terbium activated fluorescent member disclosed in Japanese Patent Application Laid-Open No. 06-248262 can be increased, however, the terbium activated fluorescent member emits light based on forbidden transition, so that it is extremely as short as several hundreds of micro seconds in luminescent decay time. This saturates a luminescence center excited in a high electric-charge density area, which does not enable luminance to be sufficiently improved. The terbium activated fluorescent member will provide a bright line on a longer wavelength side, possessing a serious drawback in that good color purity cannot be obtained. The present inventors' experiments showed that the mixture shown in Japanese Patent Application Laid-Open No. 2004-339293 provided a good blue light-emission, but did not reach a practical application level both in luminance and in lifetime.

In view of the above situations, the present invention has its purpose to provide a fluorescent member capable of restraining luminance saturation at a high electric-charge density area using high current density electron beams and providing high luminance. Furthermore, the present invention has its purpose to provide an image display apparatus and image receiving and displaying apparatus using the following substrate having a fluorescent member to solve the above problems.

First of present invention is a substrate having a fluorescent member arranged on a pixel area in a plane of a surface of the substrate, wherein the fluorescent member emits light by an irradiation with an electron and comprises a first fluorescent member having a larger gamma value and arranged in the pixel area, and a second fluorescent member having a smaller gamma value and arranged at a peripheral of the first fluorescent member within the pixel area.

Second of present invention is a substrate having a fluorescent member disposed thereon, the fluorescent member comprising first and second fluorescent members emitting light by an electron irradiation, the first fluorescent member emits light of higher luminance by the electron irradiation of a first density than light emitted by the second fluorescent member by the electron irradiation of the first density, while the second fluorescent member emits light of higher luminance by the electron irradiation of a second density than light emitted by the first fluorescent member by the electron irradiation of the second density, wherein the first density is smaller than the second density, and wherein the first fluorescent member is disposed on the substrate at a position corresponding to the electron irradiation of the first density, while the second fluorescent member is disposed on the substrate at a position corresponding to the electron irradiation of the second density.

Further features of the present invention will become apparent from the following description of exemplary embodiments with reference to the attached drawings.

DESCRIPTION OF THE EMBODIMENTS

The embodiments of the present invention are described in detail below. The substrate having a fluorescent member of the present invention is characterized in that a pixel area on which pixel is arranged includes a first fluorescent-member area where a first fluorescent member is arranged and a second fluorescent-member area where a second fluorescent member smaller in gamma value than the first fluorescent member is arranged. The value of $\gamma$ is defined by an equation: $B=I_k^\gamma$.

Wherein, B is brightness and I is current. Luminance B is proportional to the $\gamma$-th power of current (density) I.

Figure 1:
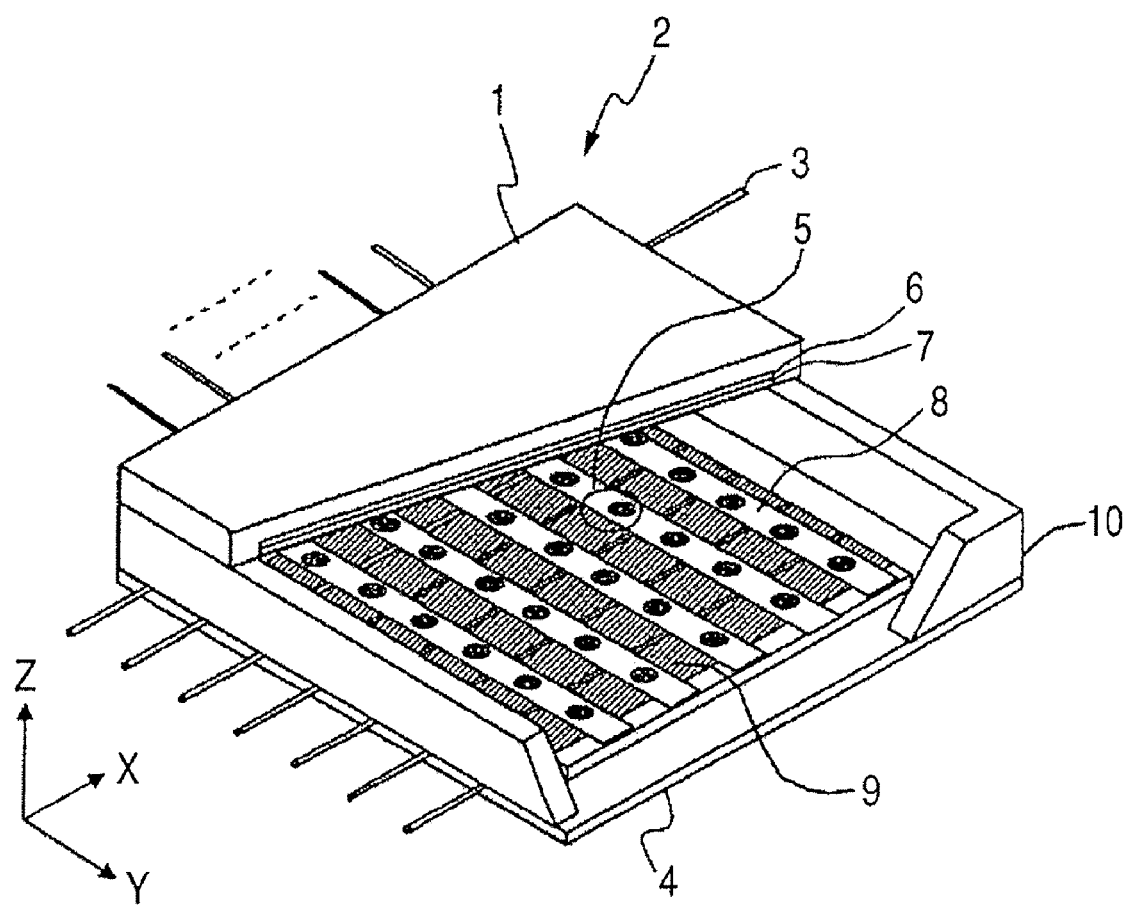
FIG. 1 is a perspective view illustrating the internal structure of an image display apparatus with the substrate having a fluorescent member according to the present invention.

FIG. 1 is a schematic perspective view illustrating the internal structure of an image display apparatus with the substrate having a fluorescent member according to the present invention. A display apparatus 2 is a vacuum hermetic vessel for displaying image information. The display apparatus 2 includes a substrate 1 having a fluorescent member and a rear substrate 4 provided with a cathode. The substrate 1 having a fluorescent member is provided with a metal back 7 being an anode and a fluorescent-member layer 6. An insulating frame 10 is interposed between the substrate 1 having a fluorescent member and the rear substrate 4 to hold the gap between the substrates. The substrate 1 having a fluorescent member and the rear substrate 4 and the insulating frame 10 form a hermetic interior space and a principal part of the thin flat display apparatus. The display apparatus 2, from which air is evacuated by an exhaust pipe (not shown) communicating with a vacuum pump, is sealed by an appropriate sealing unit to maintain a high vacuum.

Figure 2:
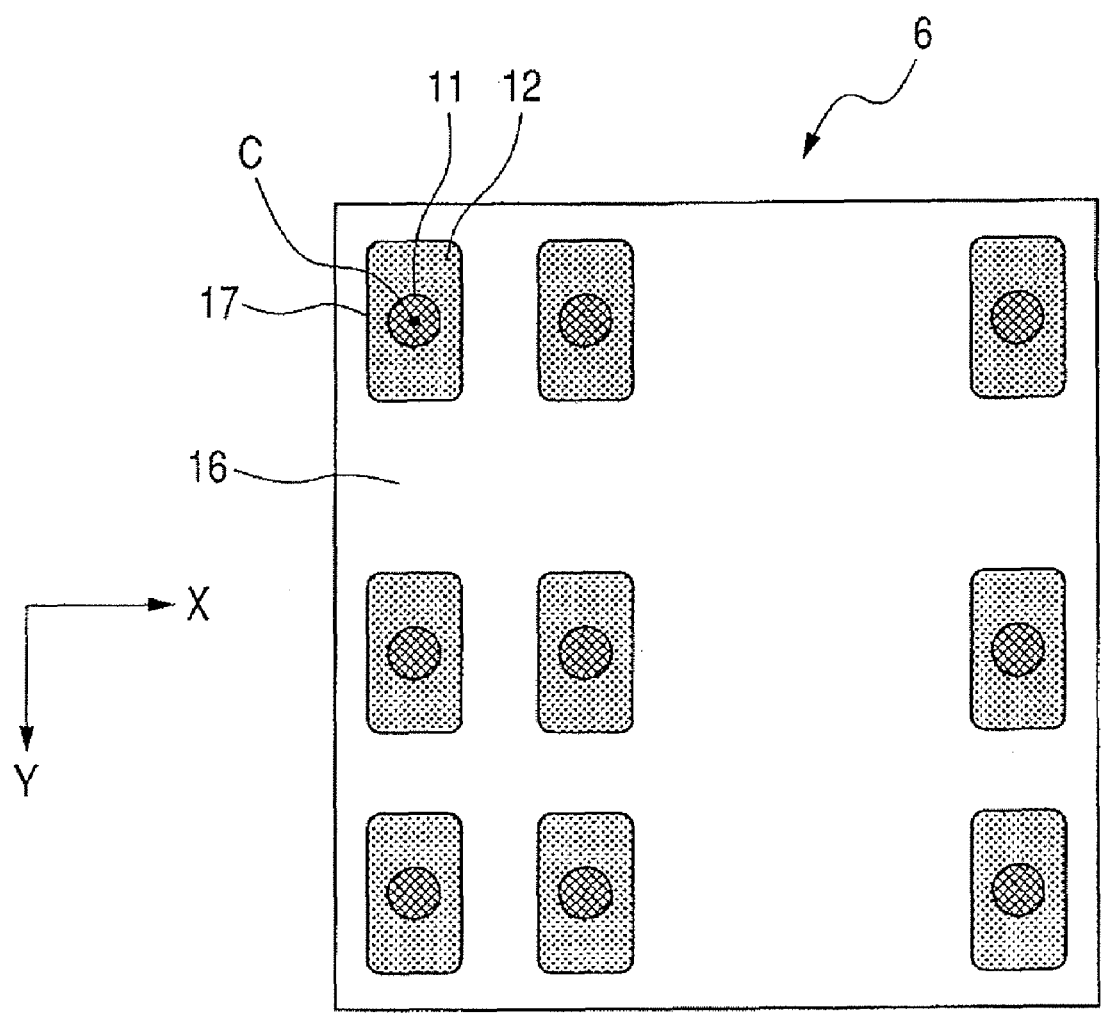
FIG. 2 is a schematic top view of the fluorescent-member layer illustrated in FIG. 1.

FIG. 2 is a schematic top view of the fluorescent-member layer. The present embodiment discloses the substrate having a fluorescent member for a color image display apparatus. In the present embodiment, a unit elemental area including three pixels; red, blue and green. It is to be readily understood that the present invention is applicable to a monochrome image display apparatus. A large number of pixels 17 corresponding to red, green and blue color are typically formed on the fluorescent-member layer 6 of the substrate having a fluorescent member for a color image display apparatus in the present embodiment. Each pixel 17 is struck by electrons emitted from the electron-emitting device 5 provided on the rear substrate 4 to emit any of red, green or blue light. The pixel 17 is the minimum composing element (picture element, or pixel) of an image formed by the light emission of the fluorescent member. The fluorescent member used in the substrate having a fluorescent member according to the present invention is neither limited to the member emitting the above colors, nor limited to the member emitting three colors.

Each pixel 17 forms each dot in the fluorescent-member layer 6. In general, a black portion 16 referred to as a black matrix is formed in the fluorescent-member layer 6 to form and define the pixels 17. The pixels 17 are provided corresponding to the arrangement of the electron-emitting devices 5 described later. That is to say, the electron-emitting devices 5 and the pixels 17 are arranged so that the desired pixels 17 are irradiated with electrons emitted from the electron-emitting devices 5.

Referring to FIG. 1 again, the metal back 7 is provided on the fluorescent-member layer 6 on the side of the rear substrate 4. The metal back 7 not only functions as an anode (electrode), but functions to remove electric charges on the fluorescent surface and to mirror-reflect emitted light to improve luminance. For this reason, metal with a high conductivity can be used as a material for the metal back 7. Typically, aluminum is used as a material for the metal back 7. The metal back 7 is connected to a high voltage terminal 3 to be subjected to high voltage. A getter (not shown) for absorbing gas in the image display apparatus 2 can be provided on the surface of the metal back 7 on the side of the rear substrate 4. A material for the getter 7 can be titanium or barium. The metal back 7 can be dividedly provided corresponding to each pixel 17 to decrease damage caused by discharge between the metal back 7 and a member (the electron-emitting device 5) on the rear substrate 4. In that case, connecting the divided metal backs 7 with a resisting film enables electric potential to be supplied to the metal back 7.

In the image display apparatus 2 with the hermetic vessel thus structured, the application of accelerating voltage across the rear substrate 4 and substrate 1 having a fluorescent member causes electrons emitted from the electron-emitting devices 5 to strike the surface of the pixel 17. Each pixel 17 emits a predetermined color light to display an image on the substrate 1 having a fluorescent member. Unlike a CRT, generally the FED line-sequentially drives the electron-emitting devices 5 each being independently provided for each pixel 17 to form an image. The electron-emitting devices 5 to be driven are selected by signal wirings 8 and scanning wirings 9. A Spindt field-emission device, surface-conduction device and devices using carbon fiber such as carbon nanotube (CNT) or graphite nanofiber may be used as the electron-emitting device for the image display apparatus using the substrate having a fluorescent member according to the present invention. It is desirable to use a surface conduction electron-emitting device out of these devices in terms of productivity and uniformity.

As a matter of convenience, the X, Y and Z directions are defined in FIG. 2. The X direction is one in which the signal wiring 9 extends. The Y direction is one along which signal wiring 8 extends. The Z direction is one normal to the surface of the substrate 1 having a fluorescent member on the side of the rear substrate 4 or one normal to the surface of the rear substrate 4 on the side of the substrate 1 having a fluorescent member. The X, Y and Z directions in FIGS. 2, 6, 7, 8, 9 and 10 correspond to those in FIG. 1.

Referring to FIG. 2, the pixel 17 has a first fluorescent member area 11 and a second fluorescent member area 12 small in gamma value than the first fluorescent member area 11. The first fluorescent member area 11 may be formed in the center area of the pixel 17 and the second fluorescent member area 12 may be formed in the peripheral area of the pixel 17. In other words, the second fluorescent member area 12 can be arranged in the peripheral area of the first fluorescent member area 11 when the substrate 1 having a fluorescent member is viewed from the rear substrate 4. The peripheral area of the first fluorescent member area 11 where the second fluorescent member area 12 is formed includes not only the area of the entire periphery of the first fluorescent member area 11 illustrated in FIG. 2 but the area adjacent to the first fluorescent member area 11 illustrated in FIGS. 8A and 8B. As described later, the second fluorescent member area 12 can be arranged to surround the first fluorescent member area 11 within the pixel 17. In the example illustrated in FIG. 2, the first fluorescent member area 11 is a circular shape including a center point C of the pixel 17. Portions of the first and the second fluorescent member area 11 and 12 may be superposed on each other when the substrate 1 having a fluorescent member is viewed from the rear substrate 4.

The reason two areas different in gamma value are provided in a single pixel 17 is described below. In general, in the aforementioned line sequential driving method, a current density distribution produced by irradiating the pixel 17 with electrons has a fixed pattern. It is known that the current density distribution of electron beams follow Gaussian law and Lorentz law when a Spindt field-emission electron-emitting device is used for example. It is also known that the current density distribution of electron beams forms a peak profile with a fixed distribution around the center when an electron-emitting device using carbon fiber with a large number of electric field emitting sources corresponding to one sub-pixel is used. The current density distribution of electron beams is an asymmetric, sharp and thin shape when a surface conduction electron-emitting device is used.

For this reason, the current density distribution produced by irradiating the pixel 17 with electrons becomes uneven when a typical electron-emitting device is used. In other words, the density of current flowing into the pixel 17 by electrons emitted from the electron-emitting device 5 has an uneven and predetermined distribution on a plane parallel to the fluorescent face of the pixel 17. Appropriate fluorescent members different in gamma value are selected according to portions of the pixel 17 and the size of the current density to form the fluorescent-member areas, thereby enabling luminance to be improved.

It is desirable that electrons reach the pixel 17 as much as possible to maximize a light emission efficiency and prevent unwanted electrification and heat generation in the image display apparatus 2. It is also desirable that an area highest in current density in the pixel 17 is located at the center of the pixel 17 or at the vicinity thereof. In other words, the first fluorescent member area 11 can be provided at the center of distribution of electrons reaching the pixel 17.

In the present embodiment, two kinds of the fluorescent member areas are separately formed at the center area of the pixel and the peripheral area thereof. The fluorescent member forming the center area higher in current density is higher in gamma value than that forming the peripheral area. This realizes a substrate having a fluorescent member in which luminance is further improved. This point is further described below.

Figure 3:
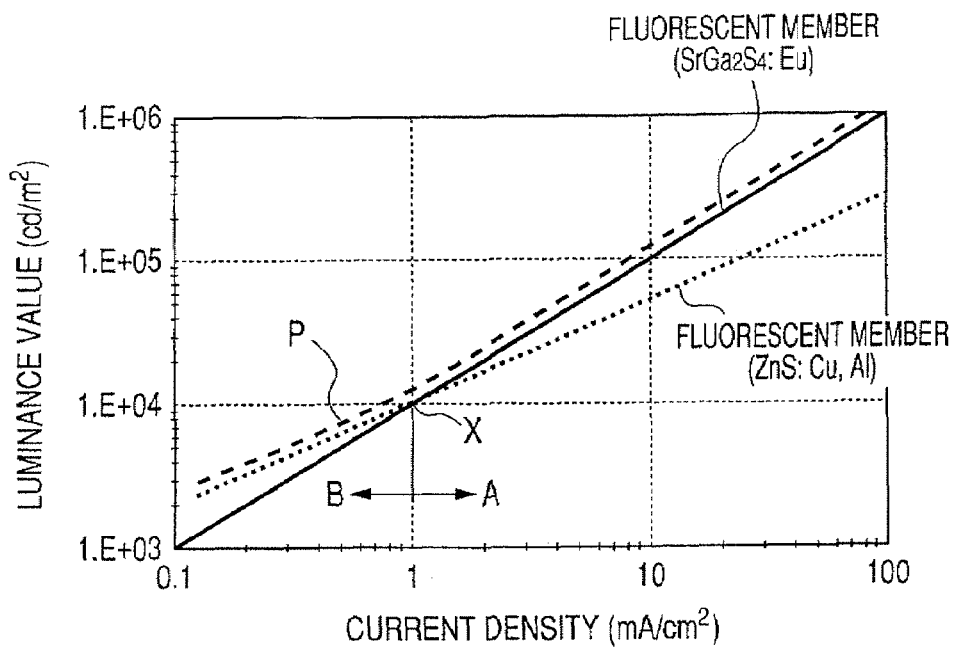
FIG. 3 is a graph illustrating the relationship of current density to luminance characteristic of a green fluorescent member.

In the present embodiment, a fluorescent member represented by the general formula $SrGa_2S_4$:Eu (europium) is arranged in the center area (the first fluorescent member area 11) of the green pixel 17. In addition, a fluorescent member represented by the general formula ZnS:Cu,Al or ZnS:Cu, Au,Al is arranged in the peripheral area (the second fluorescent member area 12) of the pixel 17. Where, the left-hand side of a colon refers to a host material and the right-hand side refers to an activator. FIG. 3 is a graph illustrating the relationship between the current density and luminance characteristic of the fluorescent members. FIG. 3 illustrates that the fluorescent member $SrGa_2S_4$:Eu is excellent in luminance linearity with respect to current density, has a gamma value (equivalent to the inclination of straight line in FIG. 3) of one (1) and is high in luminance in the higher current density area. On the other hand, the fluorescent member ZnS:Cu,Al is gentle in luminance linearity with respect to current density, has a gamma value of as low as 0.61, however, is higher in luminance in the lower current density area than the fluorescent member $SrGa_2S_4$:Eu.

As illustrated in FIG. 3, the two fluorescent members are different in gamma value with respect to current density. The luminance values of the two fluorescent members intersect at a specific current density (intersection X). The two fluorescent members have respective current density areas A and B where the one fluorescent member is higher in luminance than the other. With the position where current density occurs at the intersection X as the boundary between the first and the second fluorescent member area 11 and 12, fluorescent members higher in luminance are formed at the inner and the outer area of the boundary respectively. This provides a higher luminance all over the pixel 17 than the case where the single fluorescent member material is used. That is to say, referring to FIG. 3, the fluorescent member $SrGa_2S_4$:Eu is formed in the portion (inner area of the boundary) corresponding to the current density area A and the fluorescent member ZnS:Cu,Al is formed in the portion (outer area of the boundary) corresponding to the current density area B. The pixel 17 arranged in the above manner exhibits a current vs luminance characteristic P illustrated in the figure. Incidentally, the characteristic P is intentionally deviated from the line indicating the fluorescent member. It is to be understood that the pixel 17 arranged in the above manner provides higher luminance than that formed solely by the fluorescent member $SrGa_2S_4$:Eu or the fluorescent member ZnS:Cu,Al. The exact coincidence of the position where current density occurs at the intersection X with the boundary between the two fluorescent members produces the maximum effect, but it does not always need to exactly coincide. Even if not, a higher luminance can be obtained compared with the case where the pixel 17 is formed by the single fluorescent member.

Figure 4:
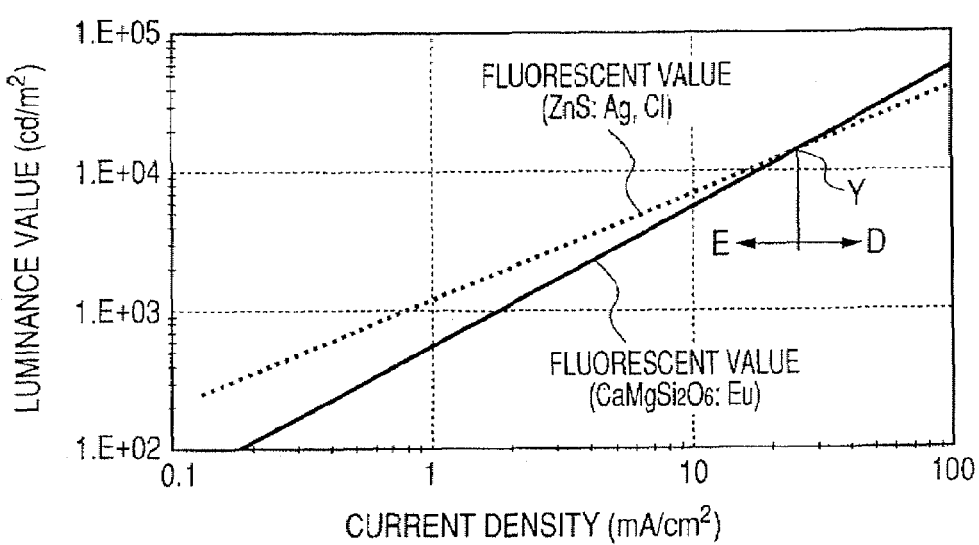
FIG. 4 is a graph illustrating the relationship of current density to luminance characteristic of a blue fluorescent member.

Similarly, a fluorescent member represented by the general formula $CaMgSi_2O_6$:Eu is arranged in the center area (the first fluorescent member area 11) of the blue pixel 17. In addition, a fluorescent member represented by one of the general formula ZnS:Ag,Cl and ZnS:Ag,Al is arranged in the peripheral area (the second fluorescent member area 12) of the blue pixel 17. FIG. 4 illustrates the relationship between the current density and luminance characteristic of the fluorescent members. As illustrated in FIG. 4, the two fluorescent members are different in gamma value with respect to current density. The luminance values of the two fluorescent members intersect at a specific current density (intersection Y). The two fluorescent members have respective current density areas D and E where the one fluorescent member is higher in luminance than the other. Similarly to the above, with the position where current density occurs at the intersection Y as the boundary between the first and the second fluorescent member area 11 and 12, fluorescent members higher in luminance are formed at the inner and the outer area of the boundary respectively. This provides a higher luminance all over the pixels 17 than the case where the single fluorescent member material is used. More specifically, the fluorescent member $CaMgSi_2O_6$:Eu is formed in the portion (inner area of the boundary) corresponding to the current density area D and the fluorescent member ZnS:Ag,Cl is formed in the portion (outer area of the boundary) corresponding to the current density area E to obtain a good result. In this case, the exact coincidence of the portion where current density occurs at the intersection Y with the boundary between the two fluorescent members produces the maximum effect, but it does not always need to exactly coincide.

The use of thus structured substrate having the fluorescent members allows displaying a high-luminance image and realizing a high-luminance image display apparatus.

In addition, an image receiving and displaying apparatus can be formed using the image display apparatus of the present invention described with reference to FIG. 1.

Figure 11:
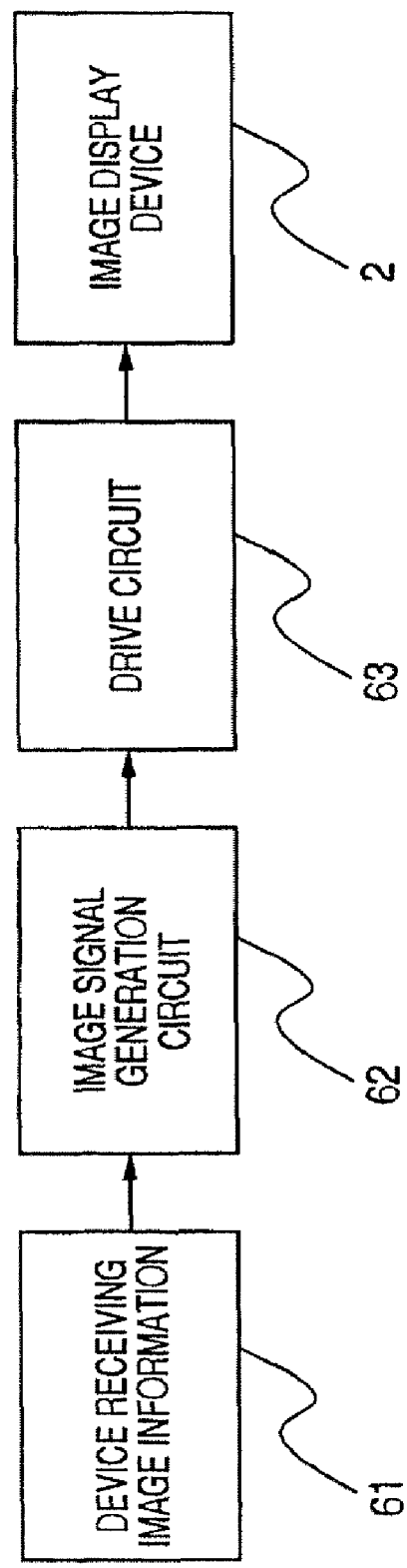
FIG. 11 is a block diagram illustrating the formation of an image receiving and displaying apparatus.

FIG. 11 is a schematic configuration of an image receiving and displaying apparatus using the image display apparatus of the present invention. In FIG. 11, the image receiving and displaying apparatus includes an image information receiving device 61, image signal generation circuit 62 and drive circuit 63. An image signal is selected and received by the image information receiving device 61 and input into the image signal generation circuit 62 to generate an image signal. A receiver such as a tuner capable of selecting and receiving an image broadcast through radio broadcasting, cable broadcast and Internet may be cited as an example of the image information receiving device 61. An audio equipment may be connected to the image information receiving device 61 to form a television set including the image signal generation circuit 62, the drive circuit 63 and the image display apparatus 2. The image signal generation circuit 62 generates an image signal corresponding to each picture element of the image display apparatus 2 from the image information and inputs it into the drive circuit 63. The drive circuit 63 controls a voltage applied to the image display apparatus 2 based on the input image signal to cause the image display apparatus 2 to display the image.

Although the center area of the pixel 17 is a circle including the center point of the pixel 17, the center area may be an ellipse, rectangle or square including the center point of the pixel 17. A shape, such as, circle, ellipse, rectangle or square for the center area is easy to form at the actual process and desirable. The shape facilitates the formation of the optimum area even if a large number of electron beam profiles disperse. Although the two areas different in gamma value are provided on the pixel 17 in the present embodiment, three areas different in gamma value may be provided thereon.

Although the pixel 17 has typically a rectangular shape which is shorter in the X direction and longer in the Y direction as illustrated in FIG. 2, it is not limited to the above. The pixel 17 having, for example, an elliptic, rectangular or square shape which is longer in the X direction and shorter in the Y direction may be provided on the substrate having a fluorescent member.

EXAMPLES

The present invention is described in detail based on the examples.

Examples 1-5

Figure 5:
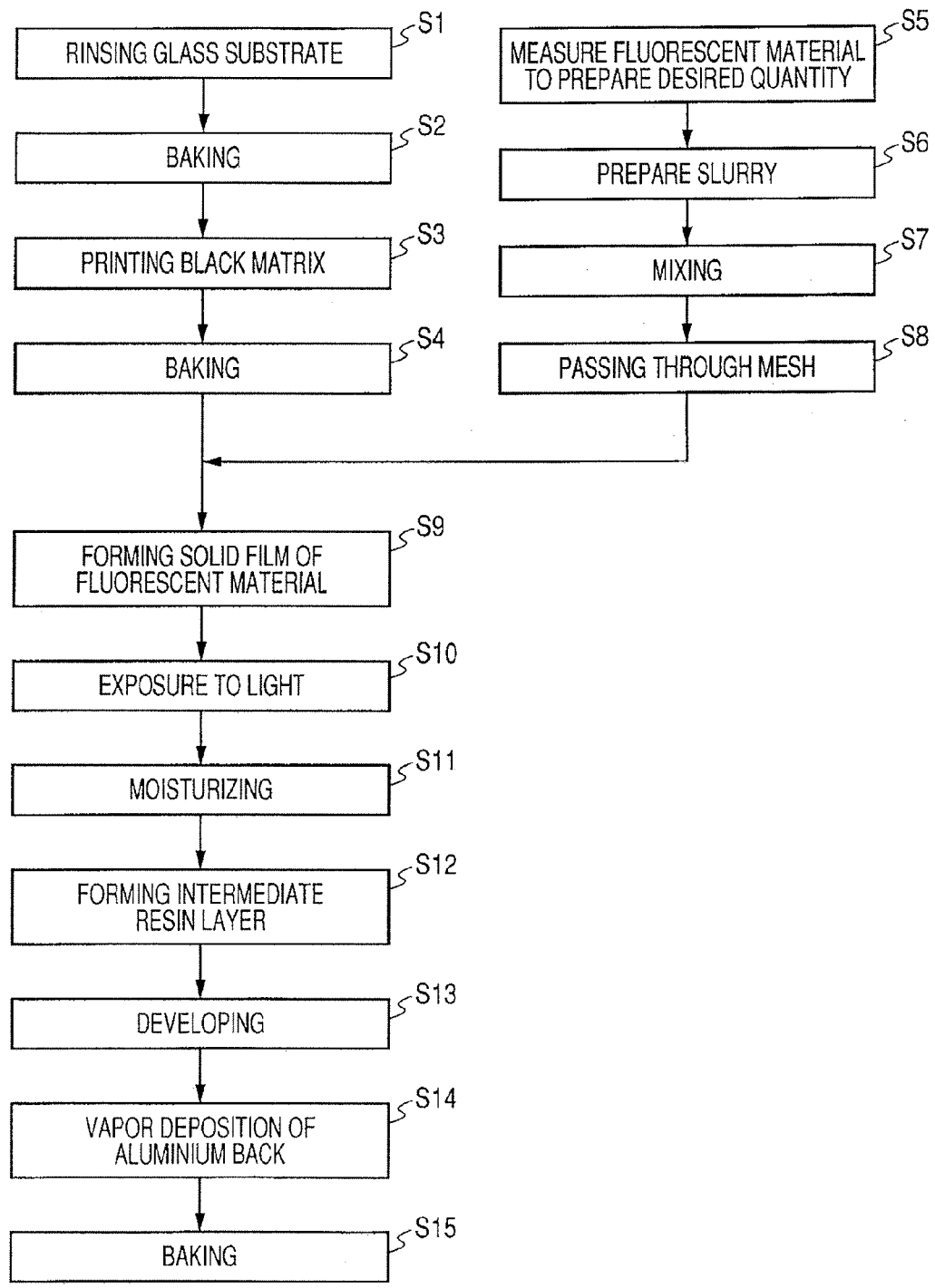
FIG. 5 is a flow chart illustrating a method of producing the substrate having a fluorescent member.

The substrate having a fluorescent member was produced according to the flow chart illustrated in FIG. 5. A soda lime glass substrate was baked at a temperature 823 K (550° C.) in the atmosphere for one hour. After being cooled, the substrate was subjected to scribing cleaning in an aqueous solution of neutral detergent, fully rinsed with pure water applied with ultrasonic wave and dried to produce a glass substrate with a clean surface (steps S1 and S2).

Figure 6:
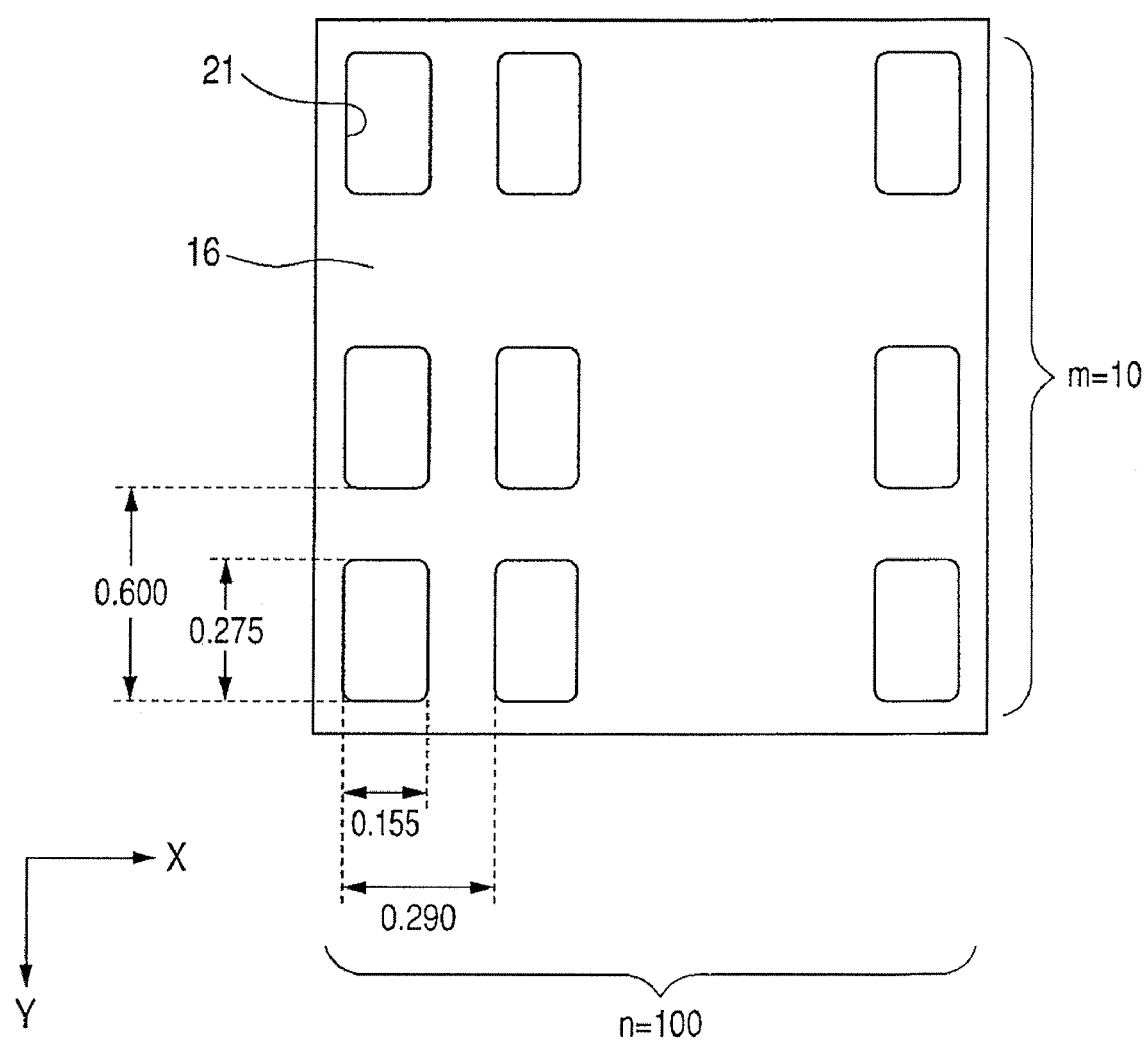
FIG. 6 is a schematic diagram illustrating patterns of pixels separately coated with fluorescent members.

In the next place, the glass substrate was placed on a screen printing apparatus, screen-printed using black pigment paste including $Cr/CrO_2$ through a patterned emulsion screen mask, dried and baked to form the black portion 16 (steps S3 and S4). As a result, as illustrated in FIG. 6, 100 openings 21 (dots) where the pixels 17 are formed, each having an area of 0.155 mm×0.275 mm, were formed with a pitch of 0.29 mm in the X direction with the black portion 16 as a boundary. Ten openings 21 were formed with a pitch of 0.6 mm in the Y direction. The openings 21 totaled up to 1000.

A fluorescent member was formed on the glass substrate with the black matrix in the manner described below. The fluorescent member $CaMgSi_2O_6$:Eu emitting blue light was prepared as a first fluorescent member. The fluorescent member had a gamma value of approximately one (1). The fluorescent member (100 g) was weighed (step S5), stirred and dispersed in a 500 ml glass beaker filled with 160 g pure water (step S6). An 8.6 g polyvinyl alcohol, 0.43 g ammonium dichromate, 0.01 g anionic surfactant and 0.025 g ether neutral surfactant were added to the dispersion liquid and stirred at a dark place for 24 hours (step S7), thereafter, passed through a stainless 200 mesh screen to remove aggregate, thereby preparing photosensitive fluorescent-member slurry (step S8).

The glass substrate was placed on a spin coater. The above slurry was dripped onto the center portion of substrate while the spin coater was being rotated at a speed of as slow as 20 rpm to 30 rpm. In addition, the film of the first photosensitive fluorescent member was formed on the glass substrate at a speed of 100 rpm to 150 rpm (step S9).

The glass substrate on which the film of the first fluorescent member was formed was removed from the spin coater, brought into contact with a metal mask on which a predetermined pattern is formed and mounted to an exposure equipment which uses a high pressure mercury vapor lamp to be exposed (step S10). After exposure was finished, the metal mask was removed from the glass substrate. Then, the glass substrate was placed on a developing device and developed by spraying hot-water at a temperature of 323 K (50° C.) and a pressure of 10 $Kg/cm^2$. The glass substrate was sufficiently dried with an air knife and warm wind. Thus, the fluorescent surface of the first fluorescent member being the first fluorescent member area 11 with a predetermined pattern was formed in each dot (aperture portion 21) defined by the black portion.

Then, a predetermined patterned fluorescent surface was formed using the fluorescent member ZnS:Ag emitting blue light as the second the fluorescent member in each dot defined by the black portion in the same manner that the fluorescent surface of the first fluorescent member was formed. Thus, the fluorescent-member layer 6 having a fluorescent surface separately coated with the first and the second fluorescent member with the predetermined pattern was formed in each dot. The second fluorescent member was approximately 0.8 in gamma value.

FIG. 2 illustrates the pattern of thus formed pixel 17 separately coated with the fluorescent members (or, the layout of the first and the second fluorescent member area 11 and 12). The first fluorescent member (the first fluorescent member area 11) is formed in the central area of the dot and the second fluorescent member (the second fluorescent member area 12)

is formed in the peripheral area thereof. The first fluorescent member area 11 was a 140 µm diameter circle.

The substrate was placed again on the spin coater to form a metallic film and the substrate surface was moistened (step S11). In the next place, aqueous solution of colloidal silica was sprayed thereon to adhere simultaneously the fluorescent member to powder and to glass substrate, subsequently, toluene solution of acryl lacquer was sprayed. After that, the substrate was sufficiently dried to form an intermediate resin layer (step S12). Furthermore, the substrate was set on an electron beam (EB) deposition device to deposit 80 nm thick Al thereon, removed from the device, baked at a temperature of 723 K (450° C.) for one hour to remove the intermediate resin layer (Steps S13 to S15).

The above process provided the substrate having the dot separately coated with two kinds of the fluorescent members.

On the other hand, the rear substrate on which the electron-emitting devices are formed was produced in the manner described below. Ag paste and insulating paste were screen-printed, dried and baked repetitively on cleaned glass substrate in the same manner that the substrate having a fluorescent member was produced to form matrix wirings with 100 effective signal lines and 10 effective scanning lines.

After the above wirings were formed, the electron-emitting devices 5 were formed at the intersections at which the wirings intersect. The electron-emitting devices 5 were formed at positions corresponding to the pixels 17 of the substrate 1 having a fluorescent member. In the present example, a so-called Spindt electron-emitting device was used as the electron-emitting device 5.

Figure 7:
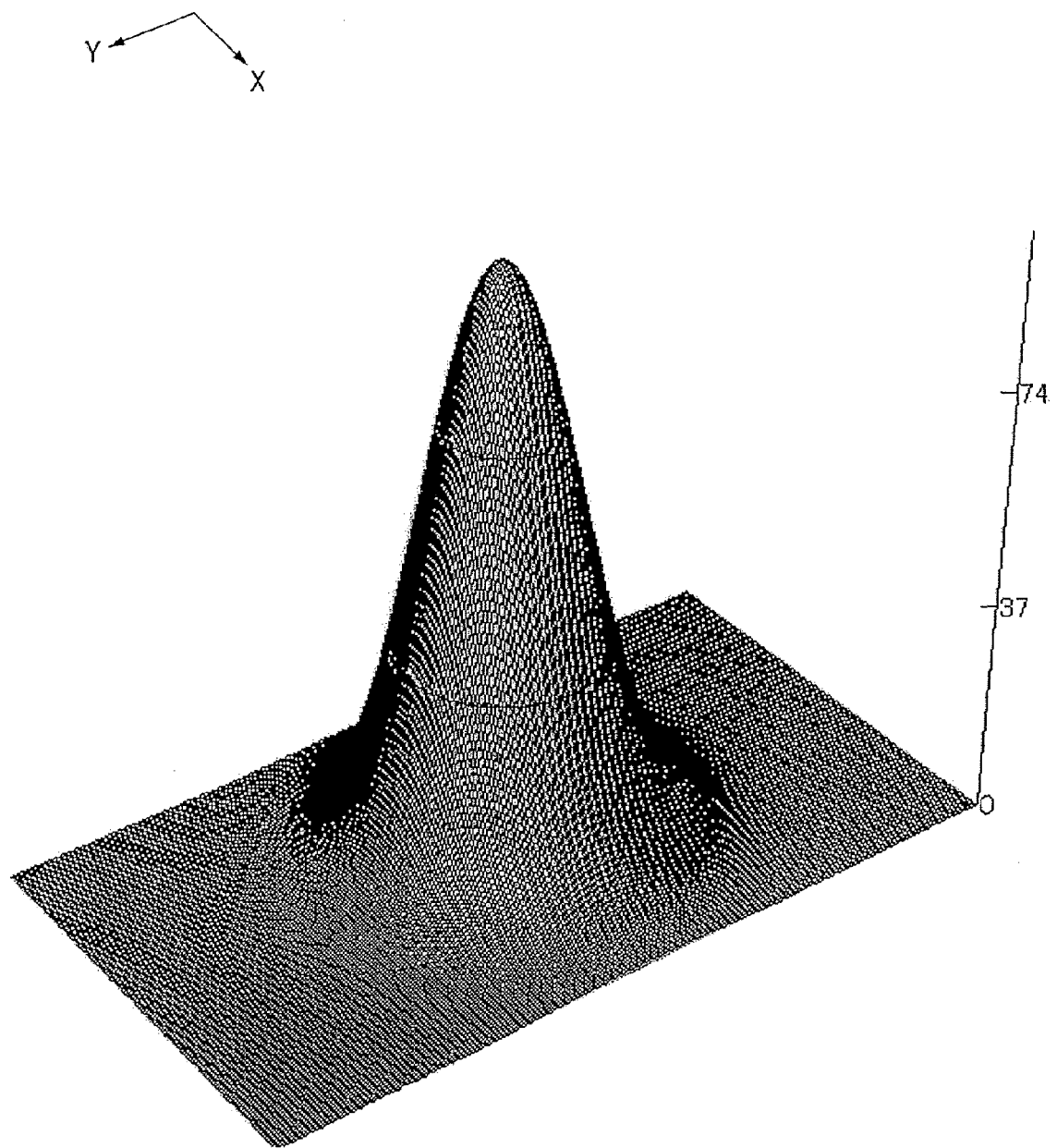
FIG. 7 is a schematic diagram illustrating a current density distribution provided using a Spindt electron-emitting device in an example 1-30.

FIG. 7 illustrates a current density distribution obtained by irradiating the pixels 17 of the present example with electrons. The current density distribution was approximately circular, which substantially follows Gaussian law both in the X and the Y direction. The peak width at half height of current density in the X and the Y direction was about 30 µm.

The formed substrate 1 having a fluorescent member was opposed to the rear substrate 4 through a 1.6 mm-thick periphery supporting frame of glass coated with lead frit and subjected to heating process under pressure to form a hermetic vessel. The vessel was connected to an appropriate exhaust system through an exhaust pipe to sufficiently evacuate air therefrom, and sealed to form the image display apparatus being a vacuum vessel. As a comparative example, an image display apparatus was produced using a substrate 1 having a fluorescent member on which only the first fluorescent member is formed in the same manner in the pixel 17 (or, the first fluorescent member was formed even in the portion where the second fluorescent member was formed in the example 1).

A device voltage was applied to each electron-emitting device 5 in the image display apparatuses to measure luminance. Specifically, a 20 µs pulse device voltage was applied the device so that an average current density is 30 rmA/cm² on the opposing pixels 17 and a beam radius is 33 µm. The image display apparatus was operated by an accelerated voltage of 10 kV and a frame frequency of 60 Hz to measure luminance. Measurement was conducted in such a manner that an irradiation spectral luminance meter (TOPCON SR-3) was arranged perpendicularly to a panel to observe one at a diopter of 1° away from 0.40 m. The image display apparatus in the present example was measured in the same driving and evaluating conditions as that in the comparative example. The results show that the luminance obtained was 1.03 times as high as that from the comparative example.

The substrate 1 having a fluorescent member of which the pixel is separately coated in the same manner as in the example 1 was produced as the examples 2-5. The first fluorescent member area 11 in the example is circular. Examples were produced in which the diameter of the first fluorescent member area 11 is changed to that shown in Table 1. Luminance of each sample was measured in the same manner as in the example 1. The results are shown in Table 1. The table shows that the pixel 17 separately coated with two kinds of the fluorescent members different in gamma value provided luminance higher by 3% to 10% than that in the comparative example.

TABLE 1

| | Shapes of 1st fluorescent member area | Diameter of 1st fluorescent member area (µm) | Luminance in case of only 1st fluorescent member (relative value) |
|---|---|---|---|
| Example 1 | Circular shape | 140 | 1.03 |
| Example 2 | Circular shape | 92 | 1.09 |
| Example 3 | Circular shape | 68 | 1.10 |
| Example 4 | Circular shape | 48 | 1.07 |
| Example 5 | Circular shape | 26 | 1.05 |

Example 6-10

Figure 8A:
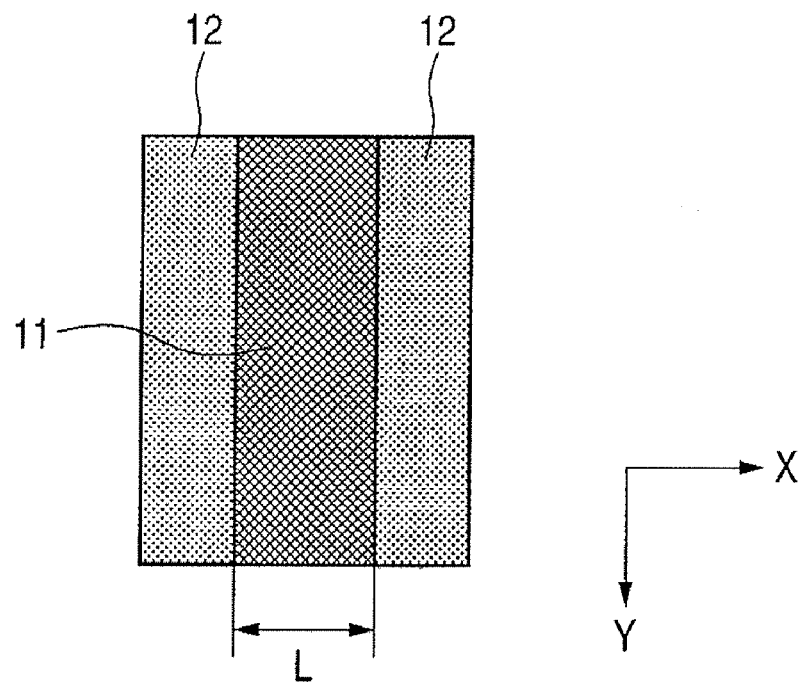
FIGS. 8A, 8B and 8C are schematic diagrams illustrating other patterns of pixels separately coated with fluorescent members.

The substrate 1 having a fluorescent member was produced of which the pixel 17 is separately coated with a fluorescent member in the same manner as in the examples 1-5. FIG. 8A illustrates a pattern of the formed pixel 17 separately coated with the fluorescent members. The first fluorescent member area 11 was formed in a vertical stripe at the center of the pixel 17. The second fluorescent member area 12 was formed at the left and the right of the striped portion. In other words, the first and the second fluorescent member areas 11 and 12 were provided in parallel in the X direction so as to interpose the first fluorescent member area 11 between the second fluorescent member areas 12. Samples were produced in which the width L of the vertical stripe in the first fluorescent member area 11 is changed as shown in Table 2. An image display apparatus was produced by using the substrate 1 having a fluorescent member in the same manner as in the examples 1-5 to measure luminance in the same manner as in the examples 1-5. The results are shown in Table 2. The table shows that the pixel 17 separately coated in the vertical stripe with two kinds of fluorescent members different in gamma value provided luminance higher by 3% to 6% than that in the comparative example.

TABLE 2

| | Shapes of 1st fluorescent member area | Stripe width L of 1st fluorescent member area (µm) | Luminance in case of only 1st fluorescent member (relative value) |
|---|---|---|---|
| Example 6 | Lateral stripe | 50 | 1.03 |
| Example 7 | Lateral stripe | 38 | 1.05 |
| Example 8 | Lateral stripe | 27 | 1.06 |
| Example 9 | Lateral stripe | 19 | 1.06 |
| Example 10 | Lateral stripe | 10 | 1.03 |

Examples 11-15

Figure 8B:
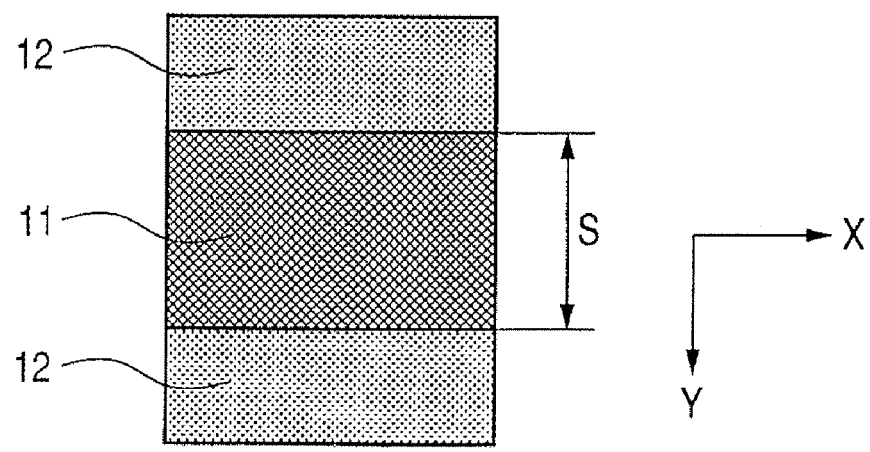

The substrate 1 having a fluorescent member was produced of which the pixel 17 is separately coated in the same manner as in the examples 1-5. FIG. 8B illustrates a pattern of the formed pixel 17 separately coated with the fluorescent members. The first fluorescent member area 11 was formed in a horizontal stripe at the center of the pixel 17. The second fluorescent member area 12 was formed at the upper and the lower portion of the striped portion. In other words, the first and the second fluorescent member areas 11 and 12 were provided in parallel in the Y direction so as to interpose the first fluorescent member area 11 between the second fluorescent member areas 12. Samples were produced in which the width S of the horizontal stripe in the first fluorescent member area 11 is changed as shown in Table 3. An image display apparatus was produced by using these substrates 1 having a fluorescent member in the same manner as in the examples 1-5 to measure luminance in the same manner as in the examples 1-5. The results are shown in Table 3. The table shows that the pixel 17 separately coated in the horizontal stripe with two kinds of fluorescent members different in gamma value provided luminance higher by 2% to 7% than that in the comparative example.

TABLE 3

| | Shapes of 1st fluorescent member area | Stripe width S of 1st fluorescent member area (μm) | Luminance in case of only 1st fluorescent member (relative value) |
| --- | --- | --- | --- |
| Example 11 | Lateral stripe | 65 | 1.02 |
| Example 12 | Lateral stripe | 55 | 1.03 |
| Example 13 | Lateral stripe | 40 | 1.06 |
| Example 14 | Lateral stripe | 29 | 1.07 |
| Example 15 | Lateral stripe | 15 | 1.05 |

Example 16

A substrate 1 having a fluorescent member was produced in the same manner as in the examples 1-5. The fluorescent member SrGa$_2$S$_4$:Eu emitting green light was used as the first fluorescent member. The fluorescent member was approximately 1.0 in gamma value. The fluorescent member (100 g) was weighed, stirred and dispersed in a 500 ml glass beaker filled with 135 g pure water. An 8.2 g polyvinyl alcohol, 0.37 g ammonium dichromate, 0.01 g anionic surfactant and 0.021 g ether neutral surfactant were added to the dispersion liquid and stirred at a dark place for 24 hours, thereafter, passed through a stainless 200 mesh screen to remove aggregate to prepare photosensitive fluorescent member slurry.

The glass substrate is placed on a spin coater. The above slurry was dripped onto the center portion of substrate while the spin coater was being rotated at a speed of as slow as 20 rpm to 30 rpm. In addition, the film of the first photosensitive fluorescent member was formed on the glass substrate at a speed of 100 rpm to 150 rpm.

The glass substrate on which the film of the first fluorescent member was formed was exposed and developed in the same manner as in the examples 1-5 to form the fluorescent surface of the first fluorescent member in each dot defined by the black portion with a predetermined pattern.

The predetermined patterned fluorescent surface was formed using the fluorescent member ZnS:Cu emitting green light as the second the fluorescent member in each dot defined by the black portion in the same manner that the fluorescent surface of the first fluorescent member was formed. Thus, the fluorescent-member layer 6 having a fluorescent surface separately coated with the first and the second fluorescent member with the predetermined pattern was formed in each dot. The second fluorescent member was approximately 0.62 in gamma value.

The separately coated pattern of the fluorescent member of the pixel 17 thus formed is illustrated in FIG. 2. The first fluorescent member (the first fluorescent member area 11) was formed in the center area of the pixel 17 and the second fluorescent member (the second fluorescent member area 12) was formed in the peripheral area thereof. The first fluorescent member area 11 was a 115 μm diameter circle.

An intermediate resin layer and a metal back 7 were formed over the fluorescent surface in the same manner as in the example 1 and baked at a temperature of 723 K (450° C.) for one hour to remove the intermediate resin layer, thereby forming the substrate 1 having a fluorescent member, of which dot was separately coated with two kinds of the fluorescent members. An image display apparatus was produced by using the substrate 1 having a fluorescent member in the same manner as in the examples 1-5. As a comparative example, an image display apparatus was produced in the same manner using a substrate having a fluorescent member on which only the first fluorescent member was formed (or, the first fluorescent member was formed even in the portion where the second fluorescent member was formed in the example 16). The image display apparatus in the present example was measured in the same driving and evaluating conditions as that in the comparative example. The results show that the luminance obtained was 1.05 times as high as that from the comparative example.

A substrate 1 having a fluorescent member was produced, as examples 17-20, of which the pixel 17 was separately coated with fluorescent members in the same manner as in the example 16. The first fluorescent member area 11 is circular. Examples in which the diameter of the first fluorescent member area 11 is changed to that shown in Table 4 were produced. Luminance of each sample was measured in the same manner as in the example 16. The results are shown in Table 4. The table shows that the pixel 17 separately coated with two kinds of fluorescent members different in gamma value provided luminance higher by 3% to 6% than that in the comparative example.

TABLE 4

| | Shapes of 1st fluorescent member area | Diameter of 1st fluorescent member area (μm) | Luminance in case of only 1st fluorescent member (relative value) |
| --- | --- | --- | --- |
| Example 16 | Circular shape | 115 | 1.05 |
| Example 17 | Circular shape | 103 | 1.06 |
| Example 18 | Circular shape | 90 | 1.06 |
| Example 19 | Circular shape | 83 | 1.04 |
| Example 20 | Circular shape | 75 | 1.03 |

Examples 21-25

A substrate 1 having a fluorescent member was produced of which the pixel 17 is separately coated in the same manner as in the examples 17-20. FIG. 8A illustrates a pattern of the formed pixel 17 separately coated with the fluorescent members. The first fluorescent member area 11 was formed in a vertical stripe at the center of the pixel 17. The second fluorescent member area 12 was formed at the left and the right of the striped portion. In other words, the first and the second fluorescent member areas 11 and 12 were provided in parallel in the X direction so as to interpose the first fluorescent member areas 11 between the second fluorescent member areas 12. Samples were produced in which the width L of the vertical stripe in the first fluorescent member area 11 is changed as shown in Table 5. An image display apparatus was produced by using the substrate 1 having a fluorescent member in the same manner as in the examples 17-20 to measure luminance in the same manner as in the examples 17-20. The results are shown in Table 5. The table shows that the pixel 17 separately coated in the vertical stripe with two kinds of fluorescent members different in gamma value provided luminance higher by 1% to 3% than that in the comparative example.

TABLE 5

|  | Shapes of 1st fluorescent member area | Stripe width L of 1st fluorescent member area (μm) | Luminance in case of only 1st fluorescent member (relative value) |
|---|---|---|---|
| Example 21 | Lateral stripe | 130 | 1.01 |
| Example 22 | Lateral stripe | 100 | 1.03 |
| Example 23 | Lateral stripe | 90 | 1.03 |
| Example 24 | Lateral stripe | 78 | 1.02 |
| Example 25 | Lateral stripe | 60 | 1.01 |

Examples 26-30

A substrate 1 having a fluorescent member was produced of which the pixel 17 is separately coated in the same manner as in the examples 17-20. FIG. 8B illustrates a pattern of the formed pixel 17 separately coated with the fluorescent members. The first fluorescent member area 11 was formed in a horizontal stripe at the center of the pixel 17. The second fluorescent member area 12 was formed at the upper and the lower portion of the striped portion. In other words, the first and the second fluorescent member areas 11 and 12 were provided in parallel in the Y direction so as to interpose the first fluorescent member areas 11 between the second fluorescent member areas 12. Samples were produced in which the width S of the horizontal stripe in the first fluorescent member area 11 is changed as shown in Table 6. An image display apparatus was produced by using the substrate 1 having a fluorescent member in the same manner as in the examples 17-20 to measure luminance in the same manner as in the examples 17-20. The results are shown in Table 6. The table shows that the pixel 17 separately coated in the horizontal stripe with two kinds of fluorescent members different in gamma value provided luminance higher by 1% to 4% than that in the comparative example.

TABLE 6

|  | Shapes of 1st fluorescent member area | Stripe width S of 1st fluorescent member area (μm) | Luminance in case of only 1st fluorescent member (relative value) |
|---|---|---|---|
| Example 26 | Lateral stripe | 180 | 1.01 |
| Example 27 | Lateral stripe | 140 | 1.02 |
| Example 28 | Lateral stripe | 92 | 1.04 |
| Example 29 | Lateral stripe | 76 | 1.03 |
| Example 30 | Lateral stripe | 58 | 1.01 |

Examples 31-35

Figure 8C:
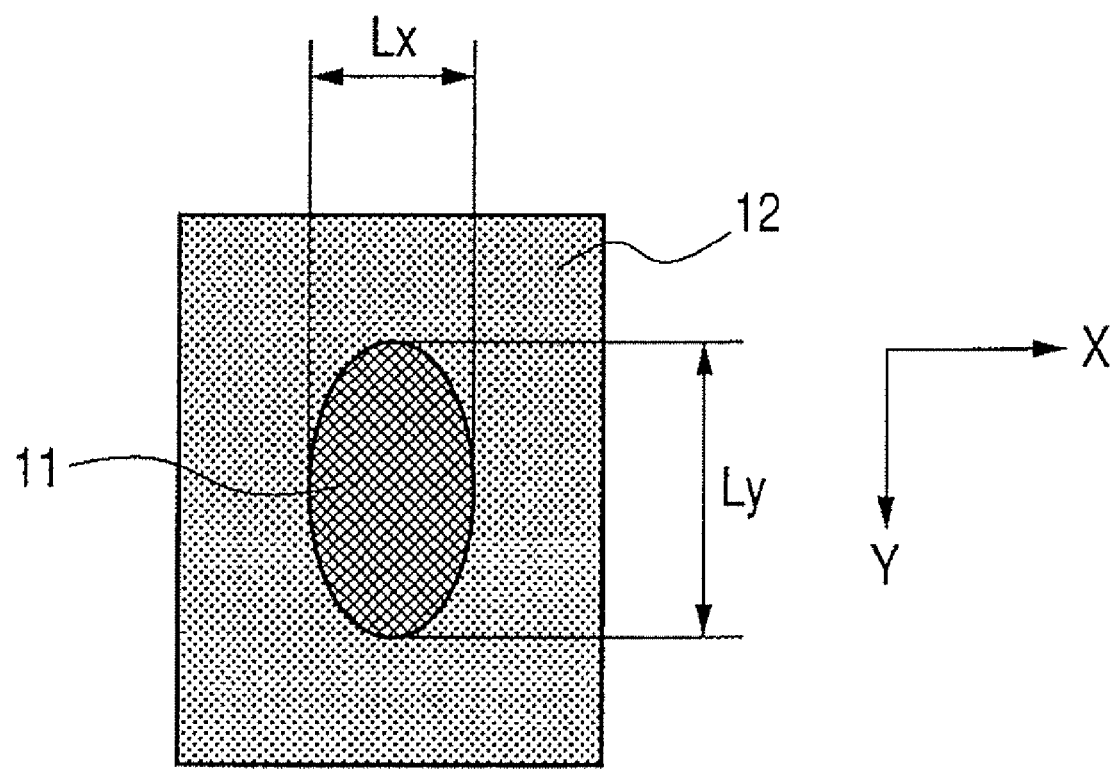

A substrate 1 having a fluorescent member was produced of which the pixel 17 is separately coated with fluorescent members in the same manner as in the examples 1-5. FIG. 8C illustrates a pattern of the formed pixel 17 separately coated with the fluorescent members. The first fluorescent member area 11 was formed in the center portion of the pixel 17. The second fluorescent member area 12 was formed around the periphery thereof. The first fluorescent member area 11 was an ellipse measuring 165 μm by 281 μm in the X and the Y direction (Lx) and (Ly) respectively.

A rear substrate 4 on which the electron-emitting devices 5 are formed was produced in the same manner as in the examples 1-5. The present example uses an electron-emitting device using a CNT as an electron-emitting member. Specifically, a commercially available bulk carbon nanotube was dispersed in cellulosic organic binder to be changed to paste and screen printed on the intersections of the signal wirings 8 and scanning wirings 9 in a circular shape, after that, binder components were baked to remove.

Figure 9:
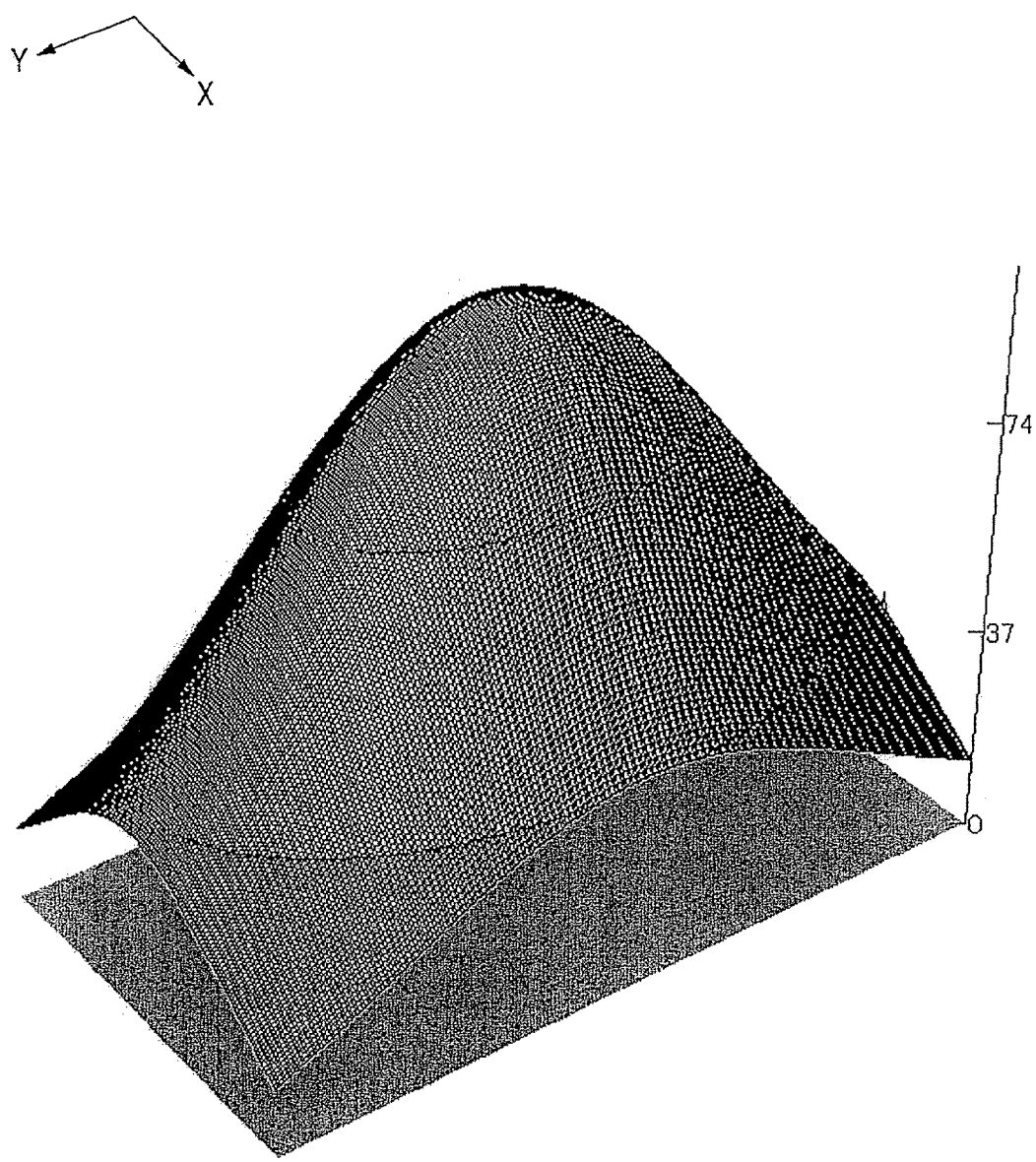
FIG. 9 is a schematic diagram illustrating a current density distribution provided using an electron-emitting device which uses a CNT in an example 31-35 as an electron-emitting member.

FIG. 9 illustrates a current density distribution obtained by irradiating the pixel 17 of the present example with electrons. The current density distribution was an ellipse measuring about 65 μm by 110 μm in peak width at half height in the X and the Y direction respectively, which is a relatively uniform beam.

An image display apparatus 2 was produced using the rear substrate 4 and the substrate 1 having a fluorescent member in the same manner as in the examples 1-5. As a comparative example, an image display apparatus 2 was produced in the same manner using a substrate 1 having a fluorescent member on which only the first fluorescent member was formed (or, the first fluorescent member was formed even in the portion where the second fluorescent member was formed in the example 1). The image display apparatus 2 was measured in the same driving and evaluating conditions as that in the comparative example in the same manner as in the examples 1-5. The results show that the luminance obtained was 1.004 times as high as that from the comparative example.

A substrate 1 having a fluorescent member was produced, as the examples 32-35, of which the pixel was separately coated with fluorescent members in the same manner as in the example 31. The first fluorescent member area 11 is elliptic. Examples in which the diameter of the first fluorescent member area 11 is changed to that shown in Table 7 were produced. Luminance of each sample was measured in the same manner as in the example 31. The results are shown in Table 7. The table shows that the pixel separately coated with two kinds of fluorescent members different in gamma value provided luminance higher by 0.1% to 0.4% than that in the comparative example.

TABLE 7

|  | Shapes of 1st fluorescent member area | Radius of 1st fluorescent member area (μm) | | Luminance in case of only 1st fluorescent member (relative value) |
|---|---|---|---|---|
|  |  | Lx | Ly |  |
| Example 31 | Elliptic shape | 165 | 281 | 1.004 |
| Example 32 | Elliptic shape | 155 | 269 | 1.004 |
| Example 33 | Elliptic shape | 145 | 243 | 1.002 |
| Example 34 | Elliptic shape | 140 | 240 | 1.001 |
| Example 35 | Elliptic shape | 135 | 235 | 1.001 |

Examples 36-40

A substrate 1 having a fluorescent member was produced of which the pixel 17 was separately coated in the same manner as in the example 1. FIG. 8B illustrates a pattern of the formed pixel 17 separately coated with the fluorescent members. The first fluorescent member area 11 was formed in a horizontal stripe at the center of the pixel 17. The second fluorescent member area 12 was formed at the upper and the lower portion of the striped portion. In other words, the first and the second fluorescent member area 11 and 12 were provided in parallel in the Y direction so as to interpose the first fluorescent member area 11 between the second fluorescent member areas 12.

A rear substrate 4 on which the electron-emitting devices 5 are formed was produced in the same manner as in the examples 1-5. The present example used a surface-conduction electron-emitting device. Specifically, the film of the surface-conduction electron-emitting device was deposited on intersections of signal wirings 8 and scanning wirings 9 by the inkjet method to form device electrodes and conductive thin film to form a slit area which becomes an electron-emitting area by electric conduction, thereafter an activating process was performed to form the electron-emitting device 5. The horizontal stripe of the first fluorescent member area 11 was 200 μm in width.

Figure 10:
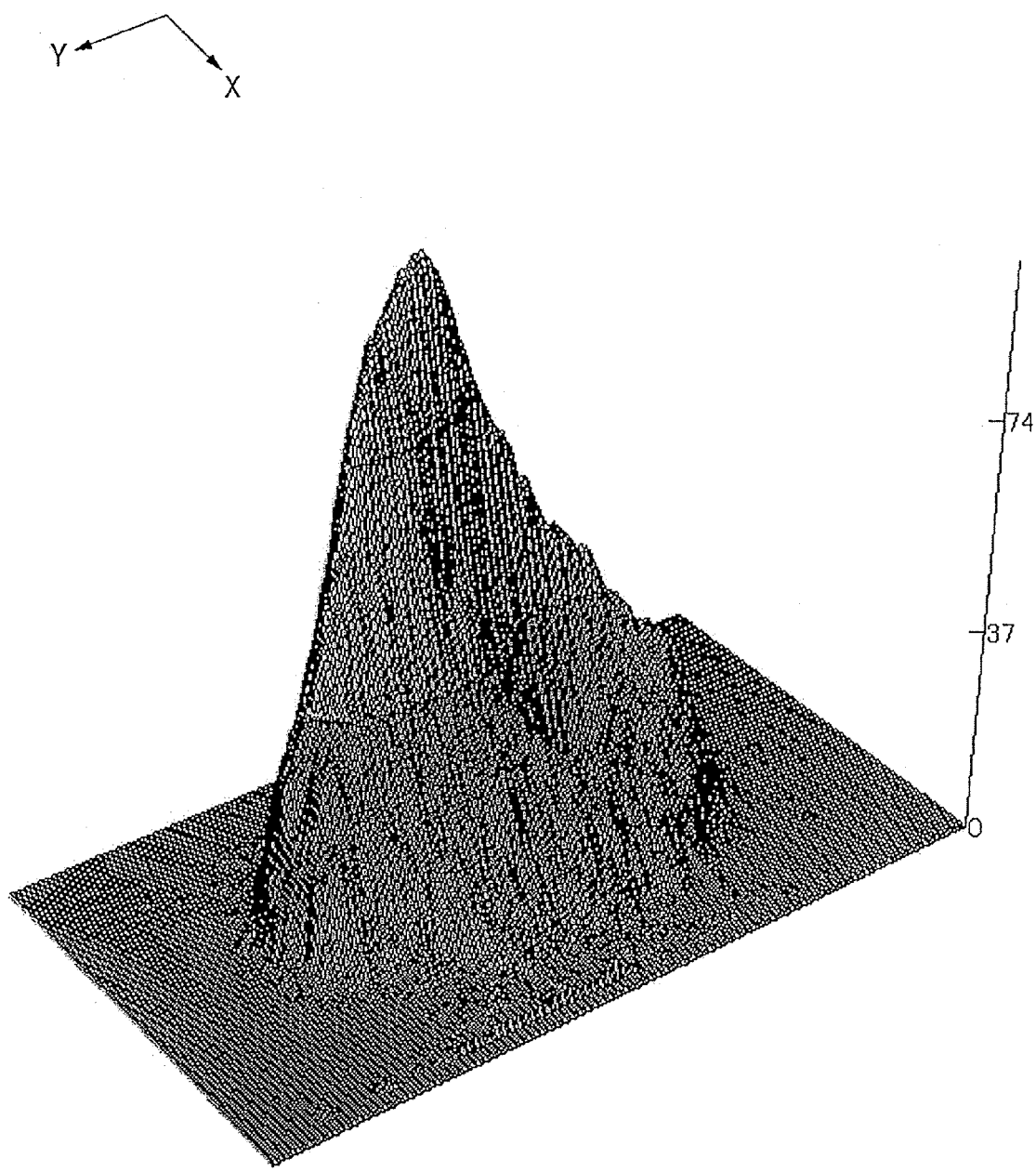
FIG. 10 a schematic diagram illustrating a current density distribution provided using a surface conduction electron-emitting device used in an example 36-40.

FIG. 10 illustrates a current density distribution obtained by irradiating the pixel 17 of the present example with electrons. The current density distribution was asymmetric, vertically long and sharp.

An image display apparatus was produced using the rear substrate 4 and the substrate 1 having a fluorescent member in the same manner as in the examples 1-5. As a comparative example, an image display apparatus was produced in the same manner using a substrate 1 having a fluorescent member on which only the first fluorescent member was formed (or, the first fluorescent member was formed even in the portion where the second fluorescent member was formed in the example 1). The image display apparatus was measured in the same driving and evaluating conditions as that in the comparative example in the same manner as in the examples 1-5. The results show that the luminance obtained was 1.03 times as high as that from the comparative example.

A substrate 1 having a fluorescent member was produced, as examples 37-40, of which the pixel 17 was separately coated in the same manner as in the example 36. Samples were produced in which the width S of the horizontal stripe in the first fluorescent member area 11 is changed as shown in Table 8. Luminance was measured in the same manner as in the example 36 using the substrate 1 having a fluorescent member. The results are shown in Table 8. The table shows that the pixel separately coated in the horizontal stripe with two kinds of fluorescent members different in gamma value provided luminance higher by 3% to 7% than that in the comparative example.

TABLE 8

| | Shape of 1st fluorescent member area | Stripe width S of 1st fluorescent member area (μm) | Luminance in case of only 1st fluorescent member (relative value) |
| --- | --- | --- | --- |
| Example 36 | Lateral stripe | 200 | 1.03 |
| Example 37 | Lateral stripe | 160 | 1.05 |
| Example 38 | Lateral stripe | 120 | 1.07 |
| Example 39 | Lateral stripe | 80 | 1.08 |
| Example 40 | Lateral stripe | 40 | 1.07 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-170080, filed Jun. 20, 2006, which is incorporated by reference herein in its entirety.

What is claimed is:

1. A substrate having a fluorescent member arranged on a pixel area in a plane of a surface of the substrate, wherein
the fluorescent member comprises a first fluorescent member that emits light in response to being irradiated with an electron arranged in the pixel area, and a second fluorescent member that emits light in response to being irradiated with an electron having a gamma value that is smaller than a gamma value of the first fluorescent member and arranged at a peripheral of the first fluorescent member within the pixel area,
wherein the first fluorescent member has a current density area where the first fluorescent member is higher in luminance than the second fluorescent member, and the second fluorescent member has a current density area where the second fluorescent member is higher in luminance than the first fluorescent member.

2. The substrate according to claim 1, wherein
the first fluorescent member is arranged at a center of the pixel area.

3. The substrate according to claim 1, wherein
the first fluorescent member is arranged in a circular or elliptic area covering a center of the pixel area.

4. The substrate according to claim 1, wherein
the first fluorescent member is arranged in a square or rectangular area covering a center of the pixel area.

5. The substrate according to claim 1, wherein
the first fluorescent member is formed from a material defined by a general formula: SrGa2S4:Eu, and
the second fluorescent member is formed from a material defined by a general formula: ZnS:Cu,Al or ZnS:Cu,Au,Al.

6. The substrate according to claim 1, wherein
the first fluorescent member is formed from a material defined by a general formula: CaMgSi2O6:Eu, and
the second fluorescent member is formed from a material defined by a general formula: ZnS:Ag,Cl or ZnS:Ag,Al.

7. An image display apparatus comprising:
a rear substrate provided with an electron-emitting device disposed in opposition to the substrate according to claim 1.

8. The image display apparatus according to claim 7, wherein
the electron-emitting device is a surface conduction type one.

9. An image receiving and display apparatus comprising
the image display apparatus according to claim 7; a receiving circuit for receiving selectively a video signal; and
an output circuit for producing an image signal to be outputted to the image display apparatus based on the video signal received by the receiving circuit.

10. A substrate having a fluorescent member disposed thereon,
the fluorescent member comprising first fluorescent member that emits light in response to being irradiating with an electron and second fluorescent member that emits light in response to being irradiating with an electron,
the first fluorescent member emits light of higher luminance by the electron irradiation of a first density than light emitted by the second fluorescent member by the electron irradiation of the first density, while the second fluorescent member emits light of higher luminance by the electron irradiation of a second density than light emitted by the first fluorescent member by the electron irradiation of the second density, wherein the first density is smaller than the second density, and wherein the first fluorescent member is disposed on the substrate at a position corresponding to the electron irradiation of the first density, while the second fluorescent member is disposed on the substrate at a position corresponding to the electron irradiation of the second density.

* * * * *